Figure 1:
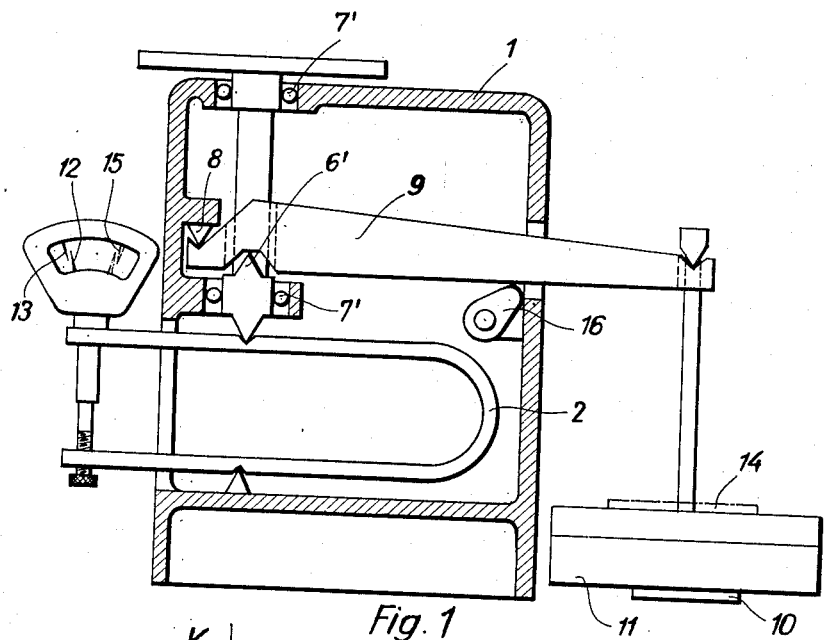

March 23, 1954

W. HOHNER 2,672,755

MEASURING DEVICE FOR FORCES, INCLUDING
CALIBRATING ATTACHMENTS

Filed July 27, 1951

Inventor:
Walter Hohner

Patented Mar. 23, 1954

2,672,755

UNITED STATES PATENT OFFICE 2,672,755

MEASURING DEVICE FOR FORCES, INCLUDING CALIBRATING ATTACHMENTS

Walter Hohner, Esslingen, Germany, assignor to Georg Reicherter, Esslingen (Neckar), Germany, a German company Application July 27, 1951, Serial No. 238,995

Claims priority, application Germany August 5, 1950

3 Claims. (Cl. 73—141)

The present invention relates to a measuring device for forces, and more particularly to a calibrating attachment for indicating the limits of a predetermined tolerance on the scale of the measuring device.

It is the object of the present invention to provide a device for testing whether a force, or a pressure, remains within predetermined tolerance limits.

It is another object of the present invention to provide a calibrating attachment for a measuring device which permits applying of test loads to the same.

It is a further object of the present invention to provide a calibrating attachment which may be disengaged from the measuring device while a force is being measured.

It is a still further object of the present invention to provide movable indicia mark means on the scale of the measuring device for marking indications caused by test loads corresponding to the tolerance limits.

It is yet another object of the present invention to provide a calibrating attachment for a measuring device for forces which can be easily and reliably operated.

With the above objects in view, the present invention mainly consists in a calibrating attachment for a measuring device including a supporting case in which a spring is mounted which acts on indicating means, when actuated by load-transmitting means to which the force to be measured is applied.

In combination with the measuring device a calibrating attachment is provided which comprises a pivoted lever engaging the load-transmitting means having on one end thereof test load applying means. Test loads applied to the lever will cause an indication on the indicating means which may be marked by movable indicia mark means provided on the scale of the indicating means.

A manually operable device is also provided in said supporting case by which the lever may be disengaged from the load-transmitting means so that a force may be measured by the measuring device.

In the event that, before the measuring operation, predetermined tolerance limits have been established by applying test loads and marked by indicia mark means on the scale, it can be easily ascertained whether the force which is being measured remains within the predetermined tolerance limits or exceeds the same.

Figure 2:
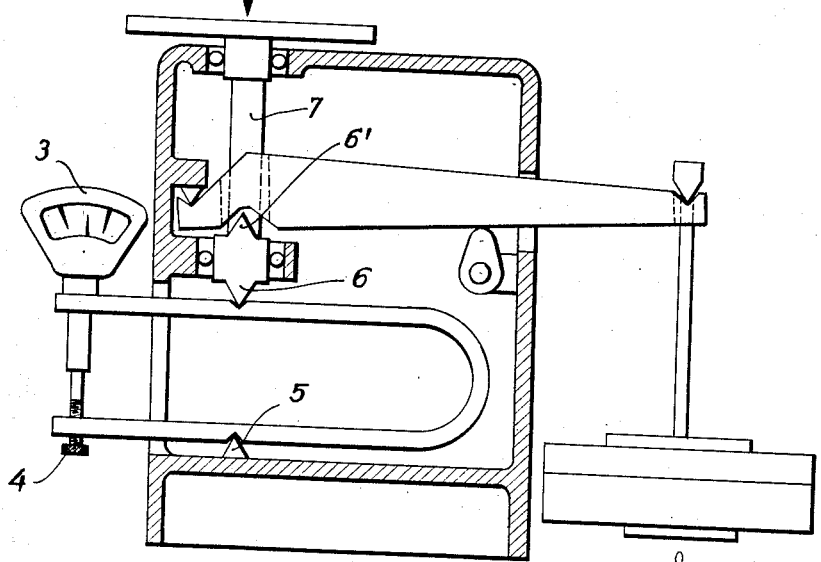

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a longitudinal cross-sectional view of a preferred embodiment of the present invention while a test load is being applied; and Fig. 2 is a longitudinal cross-sectional view of the embodiment shown in Fig. 1 during a measuring operation.

Referring now to the drawings, a U-shaped spring 2 is mounted in a supporting case 1 between two knife-edges 5 and 6. Indicating means 3 are mounted on the ends of the spring 2 and may be adjusted by an adjusting screw 4. The force to be measured is applied in the direction of the arrow K in Fig. 2 and is transmitted by load-transmitting means 7 and the knife-edge 6 secured thereto to the spring 2. The load-transmitting means 7 are movable in a vertical direction, and may be supported by ball-bearings 7' provided in the supporting case. The supporting knife-edge 5 is fixedly secured to the supporting case opposite the knife-edge 6, so that the U-shaped spring 2 is pressed together when a force is applied to the load-transmitting means 7 in direction of the arrow K. When the U-shaped spring is compressed, the indicating means 3 show an indication corresponding to the load acting on the load-transmitting means 7.

In order to calibrate the measuring device, a calibrating arrangement is provided which mainly consists of a lever 9 and test load applying means 10.

Lever 9 is pivotally mounted on a knife-edge 8, which is fixedly secured to the supporting case. When lever 9 is pivoted, the knife edge 6' secured to the load-transmitting means is pressed downwards.

A manually operable cam 16 is pivotally mounted on the supporting case, and is adapted to engage the lever 9 when turned to an upright position.

The indicating means 3 have an indicating hand 12 movable over a scale. Movable indicia mark means 13 and 15 are provided on the scale of the indicating means and may be manually shifted to any desired position.

The device operates as follows:

Fig. 1 shows the device in a position for applying test loads in order to determine the indication corresponding to predetermined tolerance limits. On the test load applying means, a weight 11 is placed which corresponds to the lower tolerance limit of the force to be measured, but is smaller than the same according to the ratio of transmission of the lever 9. The indication appearing on the indicating means is then marked by the movable indicia mark means 13.

Thereafter, the weight 14 corresponding to the tolerance is placed on the test load applying means 10, and a second indication on the indicating means, corresponding to the maximum force, is marked by the indicia mark means 15.

During this calibrating operation, the cam 16 is in inoperative position disengaged from the lever 9.

For testing whether a force applied in direction of the arrow K is within tolerance limits, the cam 16 is manually placed in upright position and disengages lever 9 from the knife-edge 6' on the load-transmitting means 7 so that the latter are freely movable, as shown in Fig. 2.

When a force, or a pressure, is applied to the load-transmitting means, the spring 2 is compressed and the indicating means show an indication. It can be easily ascertained whether the force remains within the tolerance limits established by the test-weights and indicated by the indicia mark means 13 and 15 on the scale of the indicating means.

It will be understood that each of the elements described above, or two or more together, may also find a useful application in other types of measuring devices differing from the types described above.

While the invention has been illustrated and described as embodied in a calibrating attachment for a measuring device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A measuring device for forces, comprising in combination, a supporting case; spring means substantially horizontally mounted in said supporting case; load-transmitting means substantially vertically movably mounted in said supporting case above said spring means engaging the same so as to deflect the same when a force is applied to said load-transmitting means; indicating means including a scale mounted on said spring means and actuated by the same; substantially horizontally extending lever means pivotally mounted at one end thereof in the said supporting case, engaging said load-transmitting means at a point spaced a shorter distance from said one end of said lever means than from the other end of said lever means and adapted to urge said load-transmitting means in the same direction as a force applied to the same so as to deflect said spring means and thereby actuate said indicating means when a test load is applied to the other end of said lever means in said same direction; manually operable means mounted in said supporting case movably between an inoperative position spaced from said lever means and an operative position engaging said lever means and urging the same away from said load-transmitting means in a direction opposite to said direction so as to disengage the same from said load-transmitting means and while being in said operative position adapted to hold said lever means disengaged from said load-transmitting means while a force is applied to the latter; test-load applying means secured to said other end of said lever means and adapted to receive a test load acting in said same direction so that the indication appearing on said indicating means corresponds to a multiple of a test load applied to said test-load applying means while said manually operable means are in inoperative position; and indicia mark means movably mounted on said scale of said indicating means for marking said indication caused by said test load.

2. A measuring device for forces, comprising in combination, a supporting case; spring means substantially horizontally mounted in said supporting case; load-transmitting means substantially vertically movably mounted in said supporting case above said spring means provided with one upwardly and one downwardly pointing knife-edge, and engaging said spring means with said downwardly pointing knife-edge so as to deflect the same when a force is applied to said load-transmitting means; indicating means including a scale mounted on said spring means and actuated by the same; substantially horizontally extending lever means pivotally mounted at one end thereof in the said supporting case, engaging said upwardly pointing knife-edge of said load-transmitting means at a point spaced a shorter distance from said one end of said lever means than from the other end of said lever means and adapted to urge said load-transmitting means in the same direction as a force applied to the same so as to deflect said spring means and thereby actuate said indicating means when a test load is applied to the other end of said lever means in said same direction; manually operable means mounted in said supporting case movably between an inoperative position spaced from said lever means and an operative position engaging said lever means and urging the same away from said load-transmitting means in a direction opposite to said direction so as to disengage the same from said load-transmitting means and while being in said operative position adapted to hold said lever means disengaged from said load-transmitting means while a force is applied to the latter; test-load applying means secured to said other end of said lever means and adapted to receive a test load acting in said same direction so that the indication appearing on said indicating means corresponds to a multiple of a test-load applied to said test-load applying means while said manually operable means are in inoperative position; and indicia mark means movably mounted on said scale of said indicating means for marking said indication caused by said test load.

3. Force measuring apparatus comprising, in combination, support means; an elongated force transmitting member vertically mounted in said support means for movement along its own vertical axis; said force transmitting member having a first knife edge at its lower end extending in a downward direction and a second knife edge above said first knife edge and extending upwardly; a spring mounted in said support means and having a top part in engagement with said first knife edge so as to urge said force transmitting member in an upward direction and so as to be compressed by a force transmitted along said force transmitting member in a downward direction; indicating means operatively connected to said spring for indicating the force transmitted thereto by said force transmitting member; a third knife edge fixed to said support means, facing in a downward direction, and being laterally spaced from said second knife edge; an elongated lever having a top side engaging said third knife edge, a bottom side engaging said second knife edge, and a free end portion located on the opposite side of said second knife edge from said third knife edge and at a greater distance from said second knife edge than said third knife edge so that a calibrating weight applied at said free end portion of said lever may exert on said force transmitting member a force which is greater than the calibrating weight; and a cam turnably mounted on said support means and engaging the underside of said lever between said second knife edge and said free end portion of said lever to move the latter to and from a position where said second knife edge is engaged by said lever.

WALTER HOHNER.

References Cited in the file of this patent

UNITED STATES PATENTS

| Number | Name | Date |
|---|---|---|
| 277,898 | Harty | May 22, 1883 |
| 683,477 | Meyer | Oct. 1, 1901 |
| 1,619,122 | Hem | Mar. 1, 1927 |
| 2,057,576 | Johnson | Oct. 13, 1936 |
| 2,094,405 | Leibing | Sept. 28, 1937 |
| 2,352,005 | Popov | June 20, 1944 |